UNITED STATES PATENT OFFICE.

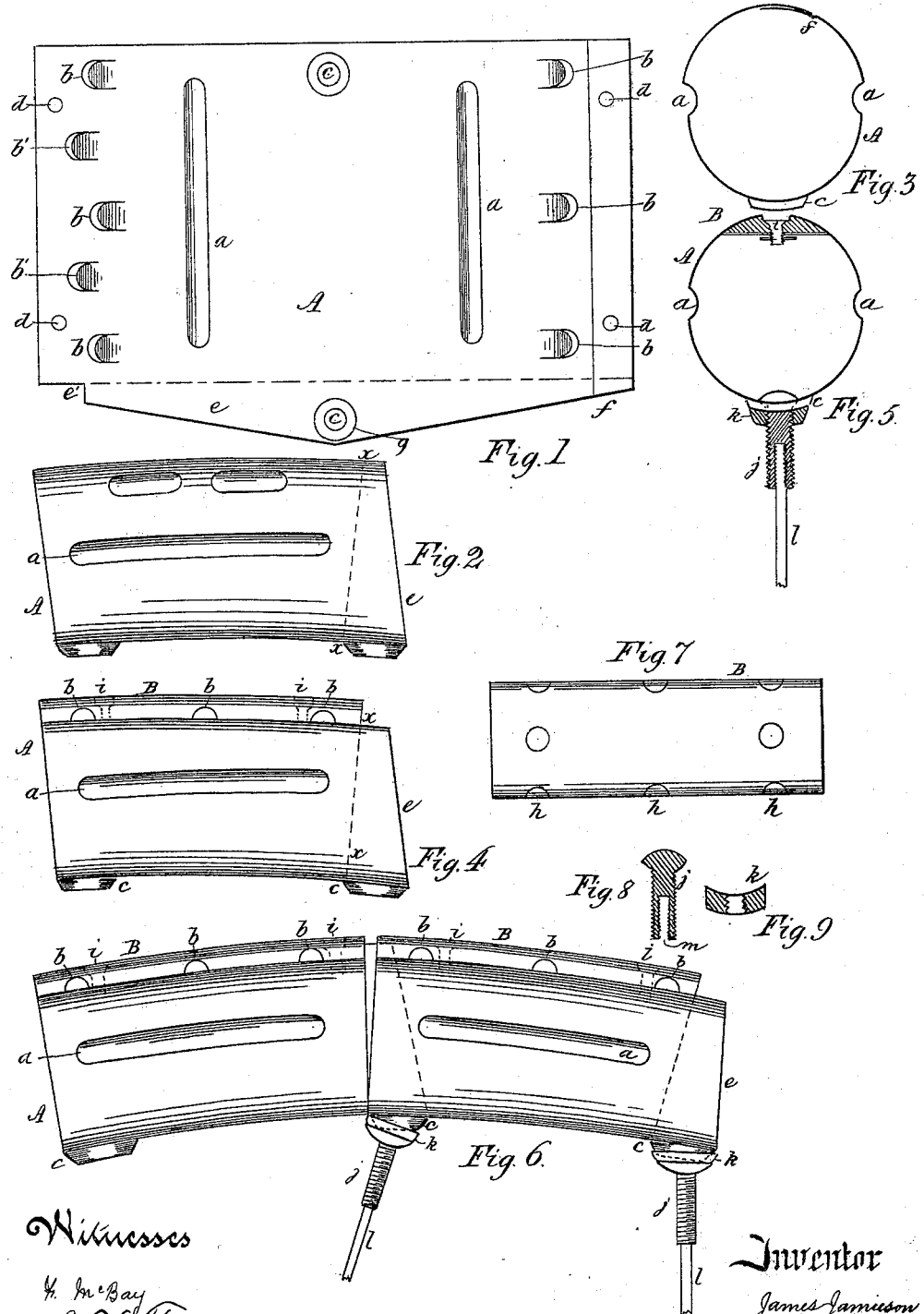

JAMES JAMIESON, OF HAMILTON, CANADA.

SHEET-METAL VEHICLE-WHEEL TIRE.

SPECIFICATION forming part of Letters Patent No. 605,435, dated June 7, 1898.

Application filed March 17, 1897. Serial No. 627,938. (No model.)

*To all whom it may concern:*

Be it known that I, JAMES JAMIESON, a citizen of the Dominion of Canada, residing at Hamilton, in the county of Wentworth, in the Province of Ontario, Canada, have invented certain new and useful Improvements in Sectional Elastic Sheet-Metal Vehicle-Wheel Tires; and I do hereby declare that the following is a full, clear, and exact description of the construction and operation of the same.

My invention relates to improvements in sectional elastic sheet-metal vehicle-wheel tires; and the object of my invention is to produce a durable, economical, flexible, punctureless tire, dispensing with the ordinary wood or metal rims, and which is especially adapted for bicycle and other vehicle wheels.

To this end my invention consists in the manner in which I secure, first, the metallic tubular-shaped sections; second, the peculiar construction involved in fastening the sections to the spokes, doing away with the ordinary rims; third, the peculiar method I employ in using sectional pads to the metallic sections and the manner in which they are secured together. I attain these objects by the mechanism illustrated in the accompanying drawings, in which—

Figure 1 represents a plan of first sheet-metal form. Fig. 2 is a side view of the same when bent in tubular form. Fig. 3 is an end view of the same. Fig. 4 is a side view similar to Fig. 2, showing the addition of a sectional pad on the outside. Fig. 5 is an end view of the same. Fig. 6 represents a side view of two sections of the tire and sectional pads and method of fastening the same. Fig. 7 represents a plan view of one of the sectional pads. Fig. 8 is a vertical section of one of the double-threaded bolts which are used to fasten the sections together and the sections and spokes together. Fig. 9 represents a cross-section of a nut that screws on the bolt which fastens the sections together and the sections and spokes together.

In the drawings, A, Fig. 1, represents a sheet-metal plate formed with two or more grooves $a\ a$ for the purpose of strengthening the same when bent in tubular-shaped form, and at the same time making them more flexible.

$b\ b\ b\ b\ b\ b$ are a series of outwardly-projecting lugs formed for the purpose of holding the sides of the pad which will be fastened thereto when the plate is bent into tubular form, and which will be more fully shown hereinafter. $b'\ b'$ are two similar lugs formed upon the inside of the plate A to support the inner edge when bent in tubular-shaped form.

$c\ c$ are openings for bolts to pass through when the plate is bent in tubular form. The said holes $c\ c$ have concavo-convex circular depressions $g$ around them in which to receive a corresponding bolt-head, as will be more fully shown hereinafter.

$d\ d$ are two holes at each end of the plate A, and they are for the purpose of inserting therein screws or rivets to hold the two ends of the said plate when bent in tubular-shaped form and lapped together. However, other equivalent means may be employed to secure the ends together, such as brazing, after they are bent to the desired form. It will be understood that the sections are spring-tempered before being united together to form a wheel-tire.

$e$ represents the bottom portion of the plate to form an end flange to be overlapped by the next section. It is shorter on one end than the other, so that the long end, when the plate is bent in tubular-shaped form, will come up against and fit in the recess of the short end at $e'$.

$f$ represents a slight bend on the outside at the right hand of the plate A the thickness of the metal, so that when the said plate is bent in tubular-shaped form the opposite end will be flush with the outside of the same.

A, Fig. 3, represents an end view of the plate when formed in tubular shape, and $e$, Fig. 2, (representing the side view of the said plate,) shows the lap from the dotted line $x\ x$ to the outer right-hand line and where at the under side of which the sections are joined together by the bolts and nuts.

B, Fig. 7, represents a plan view of a sectional pad, which may be formed of rubber or other equivalent and suitable material, and having recesses $h$ on the sides, into which the lugs $b$ are pressed to clamp the pad on the running edge of the section to prevent the pad from moving laterally. The ends of each pad B are also secured by means of screws $i$ or rivets, made to pass through the pad and section, the heads of the screws or rivets being deeply countersunk in the said pads. The side view of a pad B is seen attached to one of the sections by the screws or rivets $i$ $i$ and lugs $b$, as shown at Figs. 4 and 6.

The metallic sections A are each bent in tubular-shaped form. Then the pads B are secured thereto by screws $i$ or rivets. Then the said sections are put together, each to be overlapped by the next one, and held together by screw-bolts $j$ and nuts $k$, the construction of which and method of securing the spokes thereto and tightened may be described as follows:

$j$, Fig. 8, represents a vertical section of one of the bolts, showing the under side of the head to be formed convex to fit the corresponding shape of the recess around the bolt-hole $c$ at each end of the sections. The said bolts are screw-threaded on the outside, immediately under the head, to receive a correspondingly-shaped concave-faced nut $k$, which is made to screw upon it to tighten the parts together at the desired angle. The said screws are hollow and screw-threaded on their inner margins $m$ to receive the threaded ends of the spokes $l$, each spoke in the wheel being screwed into one of the screw-bolts $j$ and connected in the usual manner to the hub of the wheel; but upon that portion I claim nothing.

The peculiar shape of the bolt-heads and recesses in the sections to correspond is such that when the sections are placed together at their ends the bolts are passed through the openings $c$ from the inside set at the desired angle. Then the nuts $k$ (formed with a concave surface next to the section to fit same) are screwed on the outside threaded part of bolt to firmly clamp each two sections together. This construction at the same time allows of sufficient movement to each bolt to any one side, so as to be set at any desired angle to receive the threaded end of the spokes $l$, as shown at Figs. 5 and 6.

It will thus be seen that the above-mentioned tire-sections and threaded bolts when connected to threaded spokes and hub form a wheel without a rim for bicycles and other vehicles.

Having thus described my device and its advantages, what I claim as my invention, and desire to secure by Letters Patent, is—

1. A series of tubular-shaped elastic sheet-metal sections formed with openings at the ends, each surrounded with a concavo-convex-shaped depression, for corresponding bolt-heads and nuts, grooves on the sections for strength and elasticity, and lugs or projections to hold a pad all constructed when spokes and hub are attached thereto to form a wheel-tire for bicycles or other vehicles, substantially as specified.

2. A series of elastic sheet-metal sections constructed with raised lugs $b$, for clasping a pad attached to each section, grooves $a, a$, for elasticity, lugs $b', b'$, to clasp the sides when bent in tubular form, bolt-openings $c, c$, surrounded with concavo-convex recesses for corresponding bolt-heads and nuts, and openings $d, d$, for screws or rivets to fasten the sides together with a pad, and a lap $e$, substantially as and for the purpose specified.

3. A series of metallic tubular sections, A, each provided with a socket, $c$, for the end of a spoke, and each provided with a solid-rubber pad-section, B, secured directly and detachably thereto, these sections, A and B, collectively constituting a continuous, combined rim and tire, requiring no additional parts substantially as set forth.

4. In combination with the sheet-metal elastic sections, having bolt-openings surrounded with concavo-convex recesses, bolts having the under side of the head formed convex to fit said recesses, a screw-thread on the outside for a concave-faced threaded nut to screw thereon and a threaded hole on the inside to receive a spoke, substantially as and for the purpose specified.

5. A series of tubular sections, A, each having formed therewith one or more spoke-sockets, $c$, and two rows of outwardly-bent parts, $b$, in combination with rubber pads, B, fitted between these outwardly-bent parts and fastened to the said sections, the latter and the pads thereon forming a complete, continuous, combined tire and rim with rubber tread substantially as set forth.

Dated at Hamilton, Ontario, this 20th day of February, 1897.

JAMES JAMIESON.

In presence of—
  JNO. HARRISON,
  WM. BRUCE.